(12) United States Patent
Maier et al.

(10) Patent No.: US 11,699,371 B2
(45) Date of Patent: Jul. 11, 2023

(54) DISPLAY APPARATUS

(71) Applicant: TriLite Technologies GmbH, Vienna (AT)

(72) Inventors: Franz Josef Maier, Poertschach am Woerthersee (AT); Manuel Dorfmeister, Wiesen (AT); Joerg Reitterer, Brunn am Gebirge (AT); Louahab Noui, East Sussex (GB)

(73) Assignee: TriLite Technologies GmbH, Vienna (AT)

( * ) Notice: Subject to any disclaimer, the term of this patent is extended or adjusted under 35 U.S.C. 154(b) by 0 days.

(21) Appl. No.: 17/954,868

(22) Filed: Sep. 28, 2022

(65) Prior Publication Data

US 2023/0112055 A1    Apr. 13, 2023

(30) Foreign Application Priority Data

Oct. 13, 2021   (EP) .................................... 21202486

(51) Int. Cl.
  *G09G 3/02* (2006.01)
  *G02B 26/10* (2006.01)
  *G02B 27/01* (2006.01)
  *G06F 3/01* (2006.01)

(52) U.S. Cl.
  CPC ............. *G09G 3/02* (2013.01); *G02B 26/105* (2013.01); *G02B 27/0172* (2013.01); *G06F 3/013* (2013.01); *G02B 2027/0178* (2013.01); *G09G 2320/0233* (2013.01); *G09G 2320/0242* (2013.01); *G09G 2320/0247* (2013.01); *G09G 2320/0261* (2013.01); *G09G 2320/0626* (2013.01); *G09G 2340/0435* (2013.01); *G09G 2354/00* (2013.01)

(58) Field of Classification Search
  USPC ......................................................... 345/156
  See application file for complete search history.

(56) References Cited

U.S. PATENT DOCUMENTS

| 9,986,215 B1 * | 5/2018 | Tardif .................. H04N 9/3188 |
| 2013/0222774 A1 * | 8/2013 | Chikaoka ............... G02B 27/48 353/85 |

(Continued)

OTHER PUBLICATIONS

European Patent Office Search Report on Application No. 21202486.3, dated Mar. 18, 2022.

(Continued)

*Primary Examiner* — Chineyere D Wills-Burns
(74) *Attorney, Agent, or Firm* — Hoffmann and Baron, LLP; Glenn Henneberger

(57) ABSTRACT

A display apparatus comprises a mirror assembly, a first mirror of the mirror assembly oscillating about a first axis upon excitation by a first excitation signal and the first or a second mirror of the mirror assembly oscillating about a second axis upon excitation by a second excitation signal, a light source projecting a light beam onto the mirror assembly for deflection by the mirror assembly towards an image area, the light source being controlled according to pixels of image frames, a gaze tracker detecting a user's region of interest, ROI, within the image area, and a controller modulating one of the excitation signals by a first modulation signal which is dependent on the ROI detected by the gaze tracker.

16 Claims, 5 Drawing Sheets

(56) References Cited

U.S. PATENT DOCUMENTS

| | | | |
|---|---|---|---|
| 2014/0184477 A1* | 7/2014 | Hino | G06F 3/005 |
| | | | 345/8 |
| 2015/0187141 A1* | 7/2015 | Bromer | G02B 26/0833 |
| | | | 345/633 |
| 2016/0328884 A1* | 11/2016 | Schowengerdt | G02B 27/017 |
| 2017/0188021 A1 | 6/2017 | Lo et al. | |
| 2018/0120559 A1* | 5/2018 | Yeoh | G02B 5/1842 |
| 2018/0252913 A1* | 9/2018 | Tardif | G02B 26/0833 |
| 2019/0236762 A1* | 8/2019 | Abele | G02B 26/0841 |
| 2019/0279546 A1 | 9/2019 | Peuhkurinen et al. | |

OTHER PUBLICATIONS

European Patent Office Search Report on Application No. 21216944.5, dated Jun. 10, 2022.
European Search Report corresponding to Application No. 22179925.7-1020, dated Dec. 21, 2022.

* cited by examiner

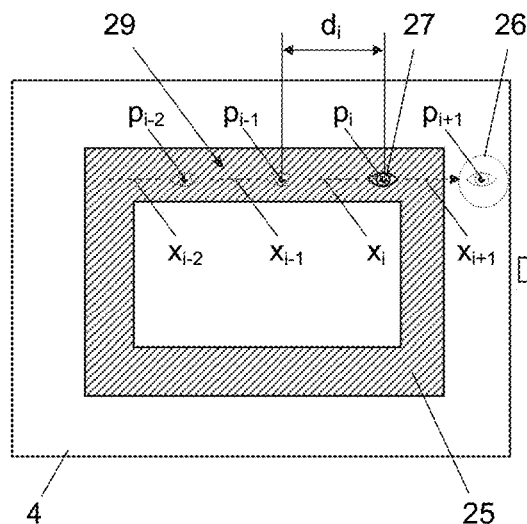
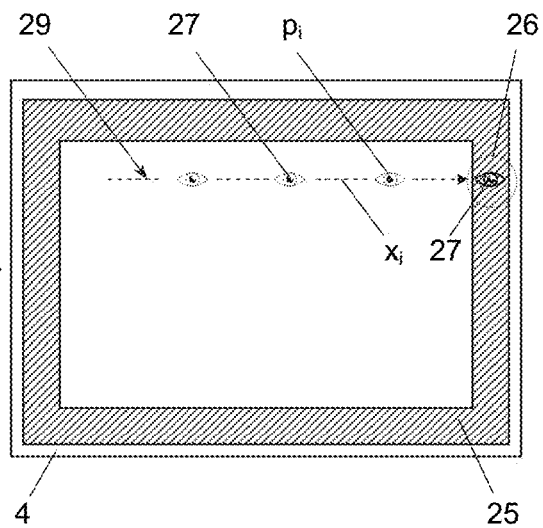
*Fig. 8A*  *Fig. 8B*
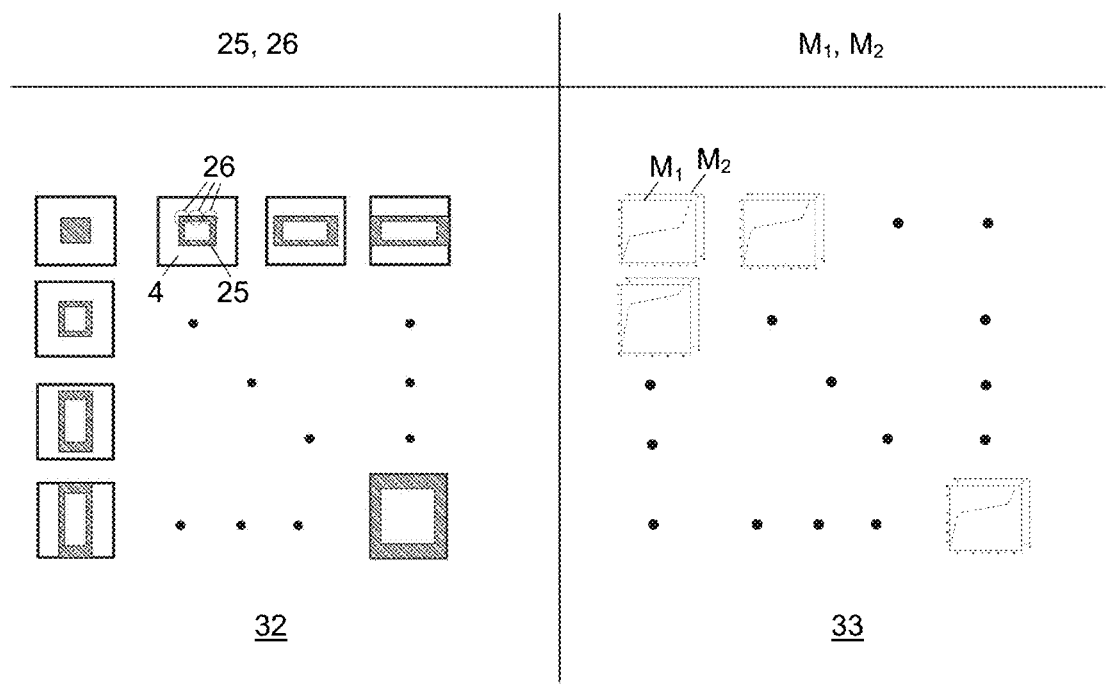
*Fig. 9*

DISPLAY APPARATUS

CROSS-REFERENCE TO RELATED APPLICATIONS

This application claims priority to the European Patent Application No. 21 202 486.3 filed Oct. 13, 2021, the disclosure of which is incorporated herein by reference.

TECHNICAL FIELD

The present disclosed subject matter relates to a display apparatus comprising a mirror assembly, wherein a first mirror of the mirror assembly is configured to oscillate about a first axis upon excitation by a first excitation signal of a first frequency and wherein the first or a second mirror of the mirror assembly is configured to oscillate about a second axis upon excitation by a second excitation signal of a second frequency, and a light source configured to project a light beam onto the mirror assembly for deflection by the mirror assembly towards an image area, the light source having an input via which it can be controlled according to pixels of image frames to be displayed on the image area with a frame rate, each pixel of the image area being hit by the light beam with a per-pixel refresh rate.

BACKGROUND

Display apparatus of this kind are commonly used in virtual reality (VR) or augmented reality (AR) glasses, helmets or head-up displays (HUDs) for a broad range of applications like navigation, training, entertainment, education or work. A light source emits a mono- or multicoloured light beam carrying an image comprised of pixels onto a moving micro-electromechanical-system (MEMS) mirror which deflects the light beam into subsequent directions (angles), one direction (angle) per pixel of the image. In raster scanning, the mirror oscillates fast about a vertical axis and slowly about a horizontal axis to sweep the directions and, thus, scan the light beam over the pixels of the image area row by row and line by line. For the fast axis oscillation, the mirror can be driven in resonance with the natural harmonics of its articulation. However, for the slow sweep about its other axis the mirror needs to be forcedly driven against its resonance frequency, which either requires more power and a larger drive system or limits the scanning speed and hence the per-pixel refresh rate and frame rate of the display.

To overcome these miniaturisation and speed limits of raster scanning, in so-called Lissajous scanning the mirror oscillates resonantly—or near resonance—about both axes. The frequencies of oscillation about the two axes are greater than the frame rate and the beginnings of their respective oscillation periods meet only every one or more frames. In this way, each frame is "painted" with a very complex, "dense" Lissajous trajectory.

With Lissajous scanning, high speeds of the laser beam along its Lissajous trajectory and hence high frame rates can be achieved with low driving powers and small actuators because of exploiting the resonance of the MEMS mirror. However, Lissajous scanners suffer from an uneven per-pixel refresh rate for two reasons. Firstly, due to the sinusoidal oscillation of the mirror about each of its two axes the light beam moves fast in the middle and slowly at the periphery of the image area. Secondly, due to the non-uniform pattern or "distribution" of the Lissajous trajectory across the image area in the frame, one pixel in the image area may be passed by the light beam once, twice or more per frame. These effects usually lead to a high per-pixel refresh rate in the periphery of the image area and a low refresh rate in the middle, which may be perceived as a flickering of the image centre.

BRIEF SUMMARY

It is an object of the disclosed subject matter to provide a display apparatus with less flickering perceived by the user.

This object is achieved with a display apparatus of the aforementioned type, which is distinguished by a gaze tracker configured to detect a user's region of interest, ROI, within the image area by tracking a user's gaze, and a controller connected to the gaze tracker and configured to modulate one of the first and second excitation signals by a first modulation signal which is dependent on the ROI detected by the gaze tracker.

By modulating (at least) one of the excitation signals of the oscillating (at least one) mirror the shape of the Lissajous trajectory drawn by the light beam on the image area is changed over time which, in turn, changes the number of times a certain pixel in the image area is hit by the light beam within a specific time period, i.e., the per-pixel refresh rate. Within the image area deliberate regions of increased per-pixel refresh rate can be achieved by applying that/those modulation signal/s that is/are associated with the ROI detected by the gaze tracker. This can be done in two different ways:

In a first embodiment, the dependency of the modulation signal/s on the ROI is such that the per-pixel refresh rate is lower in the ROI than outside of the ROI. Flickering is perceived most in the periphery of the visual field, as the peripheral rods of the human retina are more trigger sensitive than the cones responsible for colour perception in the fovea. In this embodiment, image regions with low per-pixel refresh rate are displayed within the ROI, i.e., within the foveal region of the retina where flickering is less perceived, whereas regions of increased per-pixel refresh rate are used in the neighbourhood of the ROI to avoid peripheral flickering perception. This first embodiment is particularly useful for the display of image content over the entire image area including the periphery.

In a second embodiment, the dependency of the first modulation signal on the ROI is such that the per-pixel refresh rate is higher in the ROI than outside of the ROI. This is particularly useful for the foveal display of image content, in particular when there is no content to display outside the ROI, such as in AR or HUD applications where overlay content needs to be displayed mostly in the user's foveal field of view. In this embodiment, the inventive display apparatus displays image content in the user's ROI with a dedicated high per-pixel refresh rate to avoid flickering wherever the user gazes on the image area. The display apparatus automatically follows the user's gaze and shifts the best per-pixel refresh rate available in the image area to the ROI detected by gaze tracker. In this way, an optimised display with minimal perceived flickering can be achieved, without the need to increase the oscillation frequencies of the mirror or the overall frame rate of the display, e.g. by reducing the pixel density.

In order to keep the region of increased per-pixel refresh rate, which is achieved by modulating the excitation signal/s, stable over successive frames, the frequency of the modulation signal/s is/are optionally a one- or morefold of the frame rate.

Regions of increased per-pixel refresh rate may be accompanied by an unwanted increase in light intensity, which may lead to an unevenly lit image, i.e., an incorrect display of the luminance and/or colour values of the pixels in those regions. To counter this effect, in a further embodiment of the disclosed subject matter the controller is configured to decrease the intensity of the light beam for a pixel in the ROI when the amount of time the light beam spends in that pixel during a frame increases, and vice versa.

The excitation signal/s can be modulated in different ways, e.g., by amplitude, frequency, phase or pulsewidth modulation. For example, using a frequency modulation which periodically detunes the respective excitation signal from the resonance frequency of the mirror around the respective axis also periodically alters the amplitude of the mirror oscillation because of deviating from the case of resonance. In a further embodiment of the disclosed subject matter an amplitude modulation is used to directly manipulate the amplitude of the excitation signal/s.

The ROI detected by the gaze tracker can be a region within the image area which is currently hit by the user's gaze. In a further embodiment of the disclosed subject matter, however, the gaze tracker is configured to detect the ROI by predicting the ROI from an analysis of a past track of the user's gaze on the image area. In this way, the display apparatus will pre-emptively adapt the region of increased pre-pixel refresh rate to the user's ROI so that flickering is avoided even during phases of rapid movement of the user's gaze.

The point of gaze of the human eyes, in particular when reading a text, is usually not a smooth sweep, but a series of short stops (fixations) and quick movements (saccades). During a saccade, which usually takes 20-40 ms, the brain does not process any visual information. According to a further embodiment of the disclosed subject matter, the gaze tracker is configured to determine a duration of a past saccade of the user's gaze from the analysis of the gaze track and the controller is configured to complete a change of the modulation signal/s from one ROI to another ROI within that duration. This allows for an adaptation of the mirror oscillation from one state of the excitation signal/s to another, which state change is caused by the change of the modulation signal/s from one ROI to another, to occur unnoticed.

The gaze tracker can be of any type known in the art. Unless the user's head is fixated or the display apparatus is head-mounted the direction of the user's gaze with respect to an image area in the environment is a combination of the direction of the user's head with respect to the environment and the direction of the user's eyes with respect to the head. The direction of the user's head can, e.g., be detected by an inertial measurement unit (IMU) worn on the head, or visually by a camera, etc. The direction of the user's eyes with respect to the head can be measured by an eye tracker, e.g., on the principle of measuring the reflection of light on the cornea and/or retina or by a camera monitoring eye movements. In one embodiment of the disclosed subject matter, which is particularly suitable for AR or VR glasses, the display apparatus is configured to be head-mounted and the gaze tracker is an eye tracker.

The dependency of the modulation signal/s on the detected ROI can be given by an analytical formula programmed into the controller. However, in a practical implementation the controller may have a memory with a look-up table which stores, for each one of a set of different ROIs within the image area, at least a respective first modulation signal dependent on that ROI, and the controller is configured to retrieve at least the first modulation signal dependent on the detected ROI from the look-up table. A look-up table allows for a fast real-time implementation with low processing needs and the use of prestored dependency functions found heuristically or by simulation.

Of course, all what has been said so far for modulating one of the two mirror excitation signals can be applied in much the same way for modulating both of the two excitation signals, each one with a separate modulation signal. Generally speaking, the controller is optionally configured to modulate the other one of the first and second excitation signals by a second modulation signal which is dependent on the ROI detected by the gaze tracker.

The first and second excitation signals can be modulated with different modulation signals which are entirely independent of each other and respectively change the region of increased per-pixel refresh rate independently in both dimensions across the image area. Again, in particular for AR applications the dependency of the second modulation signal on the ROI is such that the per-pixel refresh rate is higher in the ROI than outside of the ROI. If a look-up table in the memory of the controller is used, the look-up table may store, for each one of a set of different ROIs within the image area, also a respective second modulation signal dependent on that ROI, and the controller is configured to retrieve also the second modulation signal dependent on the detected ROI from the look-up table.

Any modulation signal/s for the first and/or second excitation signals which does/do the job of shifting the region of increased per-pixel refresh rate for the intended application, be it deliberately into or deliberately out of the ROI, can be used. In a first variant, at least one of the first and second modulation signals is a triangular or saw-tooth signal with an offset, and the slopes of the saw-teeth or triangles and the offset depend on the detected ROI.

In a second variant of the disclosed subject matter, at least one of the first and second modulation signals is a sequence of sine halves with an offset, and the amplitudes of the sine halves and the offset depend on the detected ROI.

In a third variant, at least one of the first and second modulation signals is a repetition of a step-like function comprised of a first and a last section with high slope, a middle section with low slope, and an offset, wherein the respective slopes and lengths of the sections and the offset depend on the detected ROI.

In a fourth variant, at least one of the first and second modulation signals is a repetition of a step function comprised of at least two sections of different respective constant values, wherein the respective values and lengths of the sections depend on the detected ROI.

BRIEF DESCRIPTION OF THE DRAWINGS

The disclosed subject matter will now be described by means of exemplary embodiments thereof with reference to the enclosed drawings, in which show.

Figure 1:
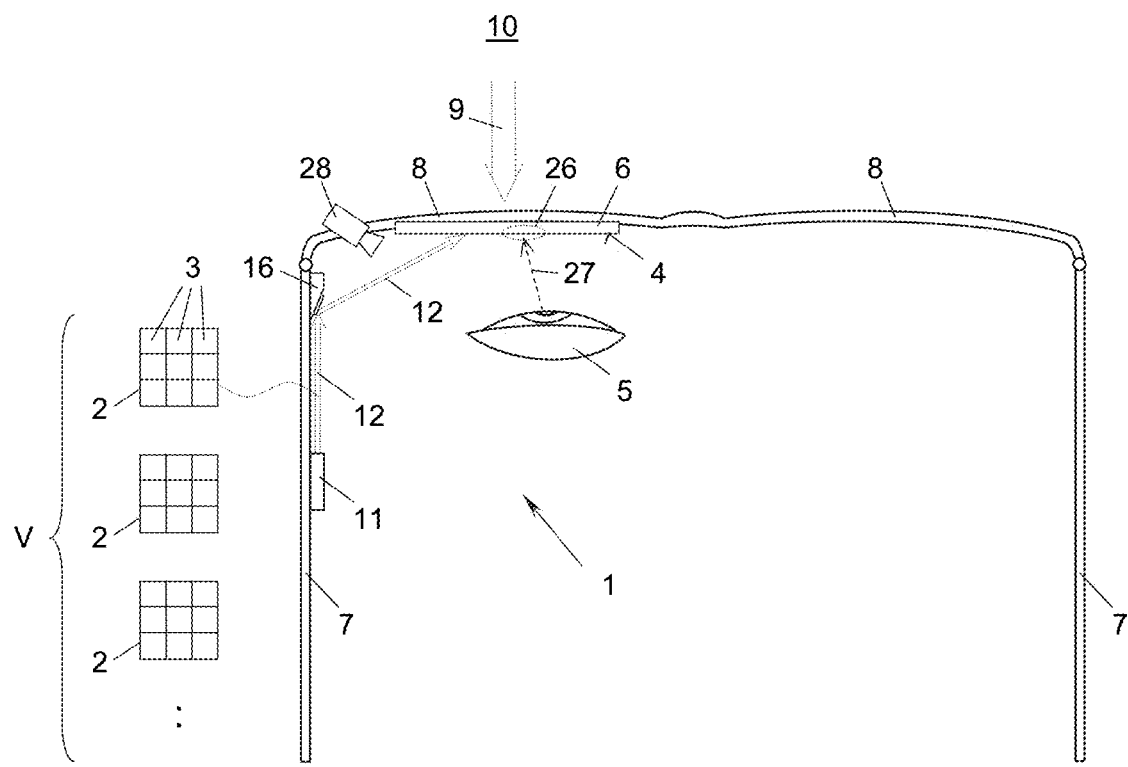
FIG. 1 the display apparatus of the disclosed subject matter built into a pair of AR glasses in a schematic top view.
Figure 2:
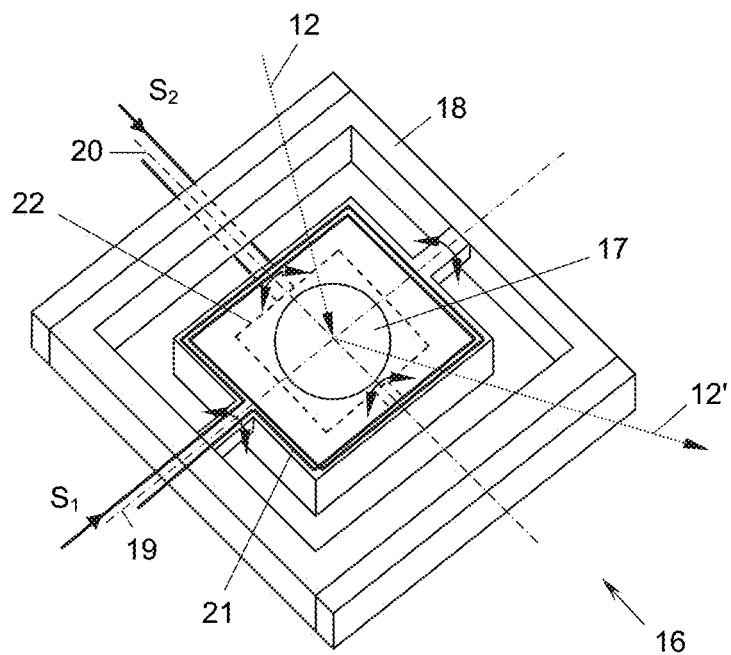
FIG. 2 the MEMS mirror of the display apparatus of FIG. 1 in a schematic perspective view.
Figure 3:
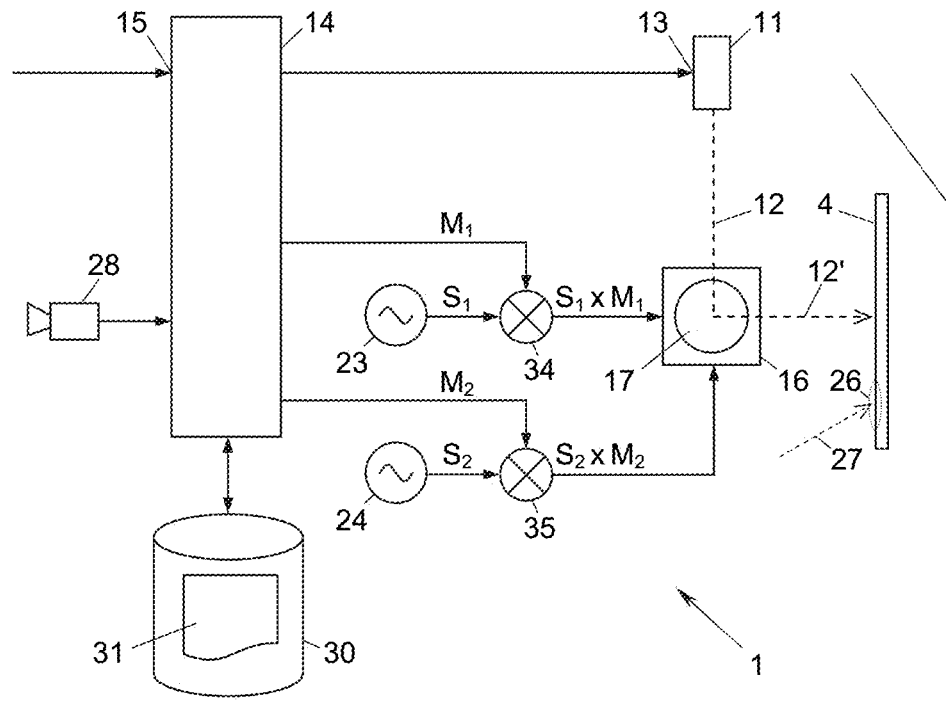
FIG. 3 the display apparatus of the disclosed subject matter in a circuit diagram.
Figure 4A:
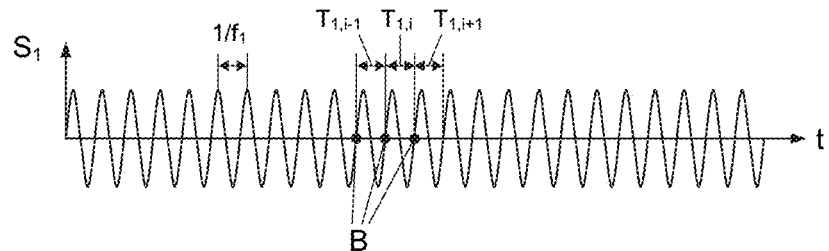
FIGS. 4A and 4B exemplary excitation signals for oscillating the mirror of FIG. 2 about its two axes of articulation.
Figure 4B:
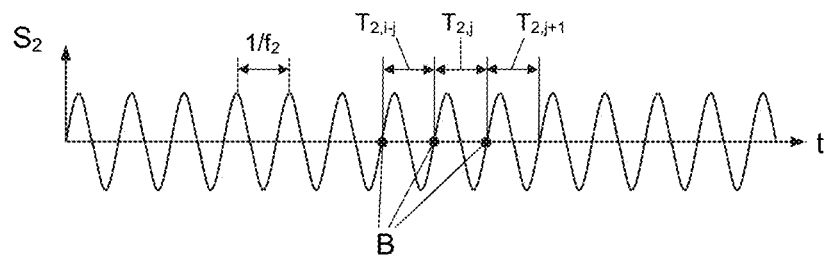
Figure 7:
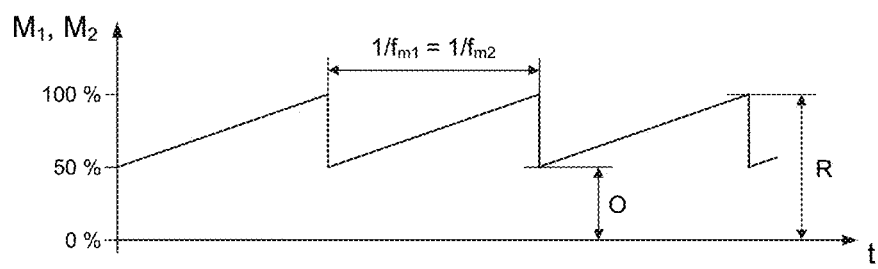
Figure 5A:
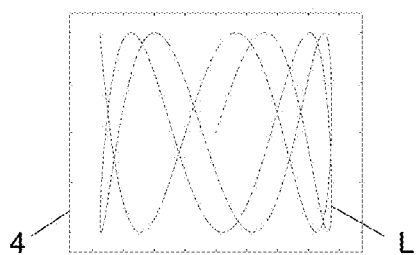
FIGS. 5A-5D four successive stages of the Lissajous trajectory of the light beam of the display apparatus of FIGS.
Figure 6A:
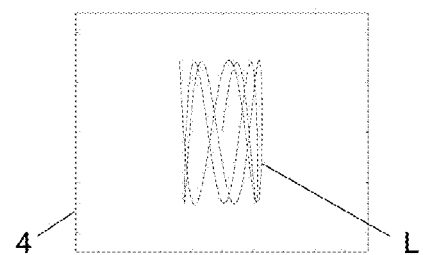
Figure 5B:
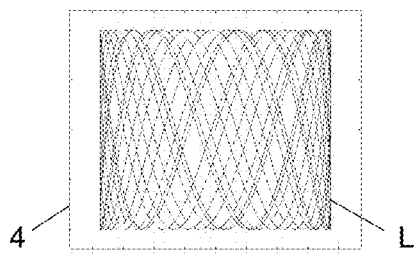
Figure 6B:
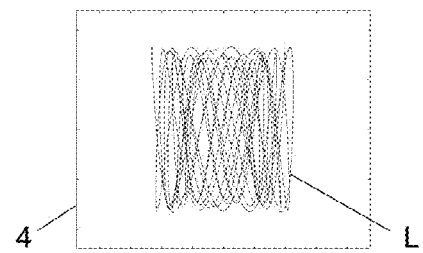
Figure 5C:
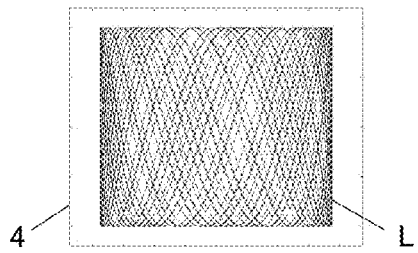
Figure 6C:
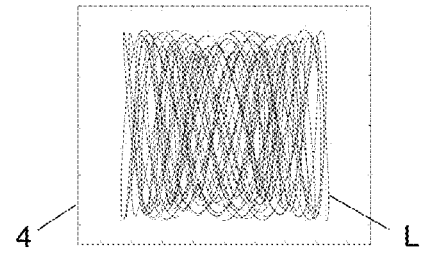
Figure 5D:
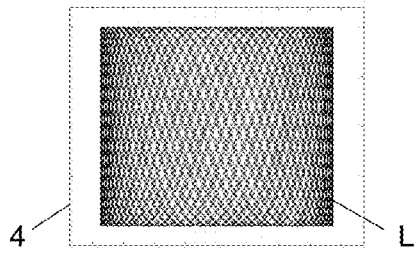
Figure 6D:
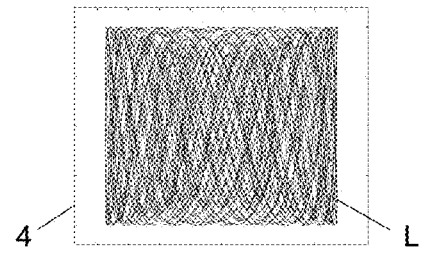
Figure 5E:
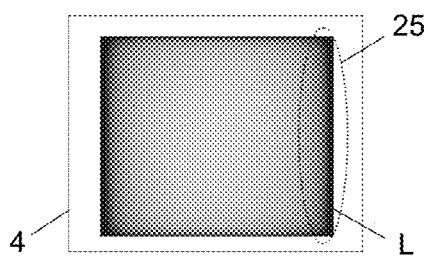
Figure 6E:
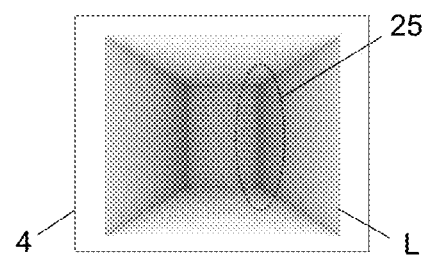

1-3 on the image area when unmodulated sinusoidal excitation signals such as those of FIGS. 4A and 4B are employed;

FIG. 5E the distribution of the per-pixel refresh rate over the image area as a result of the finalised Lissajous trajectory of FIGS. 5A-5D, wherein dark grey represents a high per-pixel refresh rate and light grey represents a low per-pixel refresh rate;

FIGS. 6A-6D four successive stages of the Lissajous trajectory of the light beam of the display apparatus of FIGS. 1-3 on the image area when sinusoidal excitation signals, amplitude-modulated with the modulation signal of FIG. 7, are employed;

FIG. 6E the distribution of the per-pixel refresh rate over the image area as a result of the finalised Lissajous trajectory of FIGS. 6A-6D, wherein dark grey represents a high per-pixel refresh rate and light grey represents a low per-pixel refresh rate;

FIG. 7 an exemplary modulation signal for one or both of the excitation signals;

FIGS. 8A and 8B the mode of operation of the gaze tracker of the display apparatus of FIGS. 1-3 and an adaptation of a region of increased per-pixel refresh rate on the image area in dependence on the ROI detected by the gaze tracker in two successive stages;

FIG. 9 an exemplary look-up table in the memory of the controller of the display apparatus of FIGS. 1-3;

FIGS. 10A-10E five further exemplary embodiments of modulation signals for the excitation signals; and FIGS. 11A-11E respective five distributions of the per-pixel refresh rate over the image area resulting from an amplitude-modulation of sinusoidal excitation signals with the modulation signals of FIGS. 10A-10E, respectively.

DETAILED DESCRIPTION

FIGS. 1 and 3 show a display apparatus 1 for projecting a series V of successive image frames 2 each comprised of pixels 3 towards an image area 4 in front of a user's eye 5. The image frames 2 follow one after another with a frame rate $f_{fr}$ and can convey a static content, i.e., several successive image frames 2 show the same content, or an image content varying from frame to frame, such as in a video sequence. In the present example the image area 4 is formed by a semi-transparent combiner 6 mounted on augmented reality (AR) glasses comprised of a spectacle frame with a pair of temples 7 and a pair of eye glasses 8. The semi-transparent combiner 6, e.g., a waveguide, a holographic or a freeform combiner, superposes the image frames 2 projected by the display apparatus 1 onto the image area 4 with a light field 9 from a surrounding 10 so that the wearer of the AR glasses can see the image frames 2 or sequence V, respectively, overlaying ("augmenting") the surrounding 10.

In the example of FIG. 1, the display apparatus 1 (or two such apparatus 1, one per eye glass 8) is built into AR glasses and used in combination with a semi-transparent combiner 6. A similar application of the display apparatus 1 could be in an AR helmet worn by a user, a handheld AR device like a smartphone with a camera, or an AR head-up display (HUD) for a vehicle, which all may use a semi-transparent combiner 6 as the image area 4. If desired, suitable waveguides, relay optics etc. can be interposed between the light display apparatus 1 and the semi-transparent combiner 6.

Instead of the semi-transparent combiner 6 the display apparatus 1 could be used with any other image area 4, e.g., a conventional reflective projection screen such as a miniature screen mounted on the frame of virtual reality (VR) glasses, or a projection wall or a movie screen, for example when the display apparatus 1 is used as a miniature (or full-scale) video beamer. The display apparatus 1 could even be used to directly project the image frames 2 into the user's eye 5, i.e., use the retina of the eye 5 as image area 4, optionally with suitable optics therebetween.

The display apparatus 1 comprises a light source 11 which emits a collimated light beam 12. The light source 11 can be of any kind including gas lasers, fibre lasers, semiconductor lasers etc. For miniaturisation the light source 11 may employ LEDs, micro LEDs or laser diodes, e.g., edge-emitting laser diodes or surface-emitting laser diodes. For colour pixels 3, the light source 11 may be a polychromatic light source 11, e.g., a set of laser diodes of three primary colour which emit a light beam 12 comprised of three different wavelengths for colour perception.

The light beam 12 carries the image frames 2 in a time-multiplexed manner, i.e., the intensity (luminance) and/or colour values of the pixels 3 one after the other in the sequence the pixels 3 are "painted" on the image area 4, when the light beam 12 is moved along a trajectory over the image area 4 as will be explained further on. To control the intensity and/or colour of the light beam 12 pixelwise, the light source 11 has a control input 13 (FIG. 3) connected to a controller 14. The controller 14 receives a stream of image data on an input 15, e.g., the video sequence V of image frames 2 encoded according to a video standard, and controls the light source 11 according to the intensity and/or colour values of the pixels 3 encoded in the image data stream. If this encoding is different from the order the pixels 3 are drawn by the light beam 12 on the image area 4, the controller 14 temporarily stores each image frame 2 in an internal buffer, from which it then successively "picks" the respective intensity and/or colour values for each pixel 3 in the drawing order of the pixels 3 along the light beam's trajectory on the image area 4.

To move (scan) the light beam 12 along its a trajectory over the image area 4, the display apparatus 1 comprises a mirror assembly 16, here: one single micro-electro-mechanical-system (MEMS) mirror, downstream of the light source 11 in the path of the light beam 12. The mirror assembly 16 deflects the light beam 12 into subsequent directions (angles) towards the image area 4. Optionally, additional optics or waveguides can be interposed in the path of the light beam 12 from the light source 11 via the mirror assembly 16 to the image area.

As shown in FIG. 2, the mirror assembly 16 comprises a mirror 17 pivotably mounted in a support 18 for oscillation about two axes 19, 20. The axes 19, 20 are perpendicular to each other and lie within the plane of the mirror 17 when the mirror 17 is at rest. Other non-perpendicular directions of the two axes 19, 20 could be chosen, as long as they are not perpendicular to the plane of the mirror 17.

To induce the oscillation of the mirror 17 about the first axis 19 a first actuator 21 acts between the mirror 17 and the support 18. The actuator 21 may be a coil attached to the mirror 17 and lying in a magnetic field of the support 18, through which coil a first excitation signal $S_1$ (here: an excitation current) is passed. For inducing the oscillation of the mirror 17 about the second axis 20 a second actuator 22 acts between the mirror 17 and the support 18, e.g., also a coil, through which a second excitation signal $S_2$ is passed. The excitation signals $S_1$, $S_2$ are obtained from signal generators 23, 24 which may be external or internal to the display apparatus 1 and may be a part of the MEMS mirror 16 or the controller 14. Instead of electromagnetic actuators 21, 22 with coils any other type of actuators for driving the oscillations of the mirror 17 about the two axes 19, 20 can be used, e.g., electrostatic, piezoelectric, electrothermal or magnetostrictive actuators.

The frequencies $f_1$ and $f_2$ of the two excitation signals $S_1$ and $S_2$ are chosen such that the mirror 17 oscillates about each axis 19, 20 at—or nearly at—the resonance frequency of the respective articulation of the mirror 17 on the support 18 (or a multiple thereof, e.g., a harmonic frequency of higher order). The resonance frequency or natural harmonics about the respective axis 19, 20 is defined, i.a., by the mass distribution of the mirror 17 about that axis 19, 20, the spring forces and frictional resistances of the articulations of the mirror 17 about that axis 19, 20, and the magnetic, electrostatic, etc. counterforces of the actuators 21, 22. By oscillating the mirror 17 about the axes 19, 20 at—or in the vicinity of—its resonance frequency about the respective axis 19, 20 a large amplitude of the mirror movement (a large angular sway) can be achieved with small excitation signals $S_1$, $S_2$, i.e., of low power or low amplitude, which allows to use particularly small actuators with small moving masses and high resonance frequencies.

To excite and maintain the resonant oscillations of the mirror 17 about the axes 19, 20 the excitation signals $S_1$, $S_2$ can be of any form, e.g., pulse signals which trigger the mirror oscillations every oscillation period, every other oscillation period or even more seldomly. However, usually the frequencies $f_1$, $f_2$ of the excitation signals $S_1$, $S_2$ will be the same as the oscillation frequencies of the mirror 17 about the axes 19, 20, and most commonly sinusoidal excitation signal $S_1$, $S_2$ will be used, as shown in FIGS. 4A and 4B.

The frequencies $f_1$ and $f_2$ of the excitation signals $S_1$ and $S_2$ are chosen such that the trajectory of the light beam 12 on the image area 4 is a Lissajous figure which covers the entire image area 4 so that each pixel 3 of the image area 4 is hit at least once by the light beam 12 per image frame 2, e.g., during the period $1/f_{fr}$ of the frames. Such a "complex" or "dense" Lissajous figure can be achieved when the frequencies $f_1$, $f_2$ are greater than the frame rate $f_{fr}$, e.g., greater than 1 kHz or tens of kHz, and the beginnings B of their respective oscillation periods $T_i=1/f_1$, $T_j=1/f_2$ (i=1, 2, j=1, 2, see FIGS. 4A and 4B) meet only over every one or more frames 2, in particular when the frequencies $f_1$, $f_2$ are close to each other. To this end, integer frequencies $f_1$, $f_2$ with a small greatest common divisor, e.g. smaller than 10, may be employed, for example.

Alternatively, instead of the single mirror 17 oscillating about two axes 19, 20, the mirror assembly 16 could comprise two mirrors (not shown) each of which oscillates about a respective one of the (e.g. perpendicular) axes 19, 20 in dependence on the respective excitation signal $S_1$, $S_2$ for successive deflection of the light beam 12. Of course, any of the embodiments described herein may be carried out for this variant as well.

FIGS. 5A-5E show the drawing of a dense Lissajous trajectory L by the laser beam 12 on the image area 4 in five successive stages. In the example of FIGS. 5A-5E, $f_1$ was 10003 Hz, $f_2$ was 35000 Hz, the resolution of the image area 4 was 1152 pixel×864 pixel. FIGS. 5A-5D show four initial stages of drawing the Lissajous trajectory L, and FIG. 5E shows the resultant "refresh rate" of the laser beam 12 per pixel 3, i.e., how often the laser beam 12 hits a specific pixel 3 during a certain time span of, e.g., 1 second, called the "per-pixel refresh rate" $RR_{xy}$, in greyscale. In FIG. 5E dark grey represents a high per-pixel refresh rate $RR_{xy}$ (e.g., above 80 Hz at the periphery of the image area 4) and light grey a low per-pixel refresh rate $RR_{xy}$ (e.g., 49 Hz in the middle of the image area 4).

By varying the amplitude of the oscillations of the mirror 17 about the two axes 19, 20 and hence the current maximum size of the trajectory L while it is drawn to "build-up" a frame, as it is shown in FIGS. 6A-6D, the local "density" of the finalised trajectory L on the image area 4 (FIG. 6E) can be altered in such a way that areas 25 in the image area 4 with a high per-pixel refresh rate $RR_{xy}$ (FIG. 5E) will occur at different locations in the image area 4, see FIG. 6E.

The amplitude of oscillations of the mirror 17 about the axes 19, 20 can be altered in different ways, for example, by changing the amplitude of the excitation signals $S_1$, $S_2$; by moving the frequencies $f_1$, $f_2$ of the excitation signals $S_1$, $S_2$ further away from the respective resonance frequency of the mirror 17 about the respective axis 19, 20, which leads to a drop of the oscillation amplitude from its maximum at resonance; by reducing the pulsewidth of a pulsed excitation signal $S_1$, $S_2$; etc. In general, the amplitude of the mirror oscillation about any of the two axes 19, 20 can be varied by amplitude modulation, frequency modulation, pulsewidth modulation or phase modulation of the respective excitation signal $S_1$, $S_2$ with a respective modulation signal $M_1$, $M_2$.

FIG. 7 shows an example of first and second modulation signals $M_1$, $M_2$ to be used to amplitude-modulate the first and second excitation signals $S_1$, $S_2$ of FIGS. 4A and 4B in form of a saw-tooth signal with a frequency $f_{m1}$, $f_{m2}$ equal to the one- or morefold of the frame rate $f_{fr}$ and an offset O of about 50% of the entire amplitude modulation range R of 100%.

The modulation of the excitation signals $S_1$, $S_2$ by the modulation signals $M_1$, $M_2$ is used in the display apparatus 1 to adapt the local per-pixel refresh rate $RR_{xy}$ in a user's region of interest, ROI, 26 (FIGS. 1, 3) on the image area 4 identified by a user's gaze 27, i.e., where the user looks to on the image area 4 with his or her eyes 5. To this end, the display apparatus 1 comprises a gaze tracker 28 which tracks the user's gaze 27 and, from an analysis of the gaze 27, detects the user's ROI 26 on the image area 4. In the head-mounted embodiment of the display apparatus 1 shown in FIG. 1, the gaze tracker 28 is an eye tracker, as it is sufficient to track a movement of the user's eyes 5 with respect to the head-mounted image area 4 formed by the transparent combiner 6. If, however, the image area 4 is not head-mounted (and the user's head not stationary), the gaze tracker 28 needs to track both the movement of the user's head with respect to the image area 4 as well as the movement of the user's eyes 5 with respect to the head in order to track the gaze 27 and detect the ROI 26 correctly. Parts of the gaze detector 28, in particular its processing components, may be implemented by the controller 14.

The gaze tracker 28 can work according to any principle known in the art, e.g., by eye-attached tracking with special contact lenses worn by the user which have embedded mirrors or sensors, or by optical tracking of corneal or retinal reflections of visible or invisible light rays. Most commonly, the gaze trackers 28 will be implemented optically, e.g., by means of a camera directed at the user's eye or eyes to view and track the gaze 27. Such a video camera can be used both for eye tracking (when head-mounted) or gaze tracking from a stationary point in the environment 10 when it views and analyses both eye movement and head movement.

The detection of the user's ROI 26 on the image area 4 is used to move the area 25 of increased per-pixel refresh rate $RR_{xy}$ achieved by the current modulation of the excitation signals $S_1$, $S_2$ applied, either into (or over) the ROI 26 or outside of the ROI 26. The latter embodiment can be useful to avoid flickering in the periphery of the user's field of view where the rods of the retina are highly responsive to fast light changes whereas the cones in the middle or fovea of the retina, which are used to look (gaze) at the ROI 26, are much less susceptible to the perception of flickering.

The former embodiment where the region 25 of increased per-pixel refresh rate $RR_{xy}$ is laid into or over the ROI 26 avoids flickering just there where the user looks to and can be particularly useful in AR applications where image content is selectively displayed as an overlay in ROI 26. This embodiment is shown in FIGS. 8A& and 8B.

In a first variant, shown in FIG. 8B, when considered alone, i.e., without FIG. 8A, the gaze detector 28 detects the current ROI 26 by analysing the gaze 27 on the image area 4 and feeds this information to the controller 14. The controller 14 is configured to calculate or chose the modulation signal/s $M_1$, $M_2$ in dependency on the detected ROI 26 so that the region 25 of increased per-pixel refresh rate $RR_{xy}$ falls into or covers the detected ROI 26 as good as possible.

As can be seen from FIG. 8B, the region 25 of increased per-pixel refresh rate $RR_{xy}$ may be symmetrical about two axes of the image area 4, i.e., look like a "frame" the size and width of which depends on the excitation and modulation signals $S_1$, $S_2$, $M_1$, $M_2$ used. The region 25 may thus be significantly greater than the ROI 26.

In a second variant shown by the sequence of FIGS. 8A and 8B, the gaze tracker 28 analyses a past track 29 of the user's gaze 27 on the image area 4, for example a sequence of fixations $p_1$, $p_2$, ..., generally $p_i$, with saccades $x_1$, $x_2$, ..., generally $x_i$, therebetween. Such a track 29 of alternating fixations $p_i$ and saccades $x_i$ occurs, for example, when a user reads a line of text displayed by the display apparatus 1. In other circumstances, e.g., when the user fixates a moving object in the environment 10, the track 29 may be a smooth slow sweep without any fixations or saccades.

From an analysis of the past track 29 of the gaze 27 the gaze tracker 28 can then predict the current ROI 26 for a frame 2 to display, and the controller 14 can—even pre-emptively—change the modulation signals $M_1$, $M_2$ so that the ROI 26 will always be hit or covered by a region 25 of increased per-pixel refresh rate $RR_{xy}$. The gaze tracker 28 can even predict a next saccade $x_{i+1}$ from an analysis of the track 29, particularly from a past sequence of fixations $p_i$ and saccades $x_i$, in order to adjust the display apparatus 1 for the next saccade $x_{i+1}$ of the user's gaze 27. When predicting the ROI 26, the gaze tracker 28 can not only predict the location of the ROI 26 but optionally also the size of the ROI 26. For instance, the size of the ROI 26 can be determined in dependence on a calculated location prediction uncertainty, e.g., in order to have a larger size of the ROI 26 in case of a higher location prediction uncertainty.

Furthermore, the gaze tracker 28 can be configured to determine a duration (or average duration) $d_i$ of one (or more) past saccades $x_i$, and the controller 14 can be configured to complete a change from a first set of modulation signals $M_1$, $M_2$—which achieves, e.g., the region 25 of FIG. 8A—to a second set of modulation signals $M_1$, $M_2$—which achieves, e.g., the region 25 of FIG. 8B—within that duration $d_i$. As the brain cannot process any visual information during a saccade, the adjusting of the display apparatus 1 to a new set of modulation signals $M_1$, $M_2$ will happen unnoticed.

The modulation signals $M_1$, $M_2$ required to achieve a specific region 25 of increased per-pixel refresh rate $RR_{xy}$ that hits or covers the ROI 26, i.e., the dependencies of the modulations signals $M_1$, $M_2$ on the detected ROI 26, can be programmed into the controller 14 in form of a formula. Alternatively, as shown in FIG. 3, the controller 14 has a memory 30 which stores a look-up table 31 for the dependencies (associations) between different possible ROIs 26—e.g., grouped according to regions 25 into which they fall—and respective first and second modulation signals $M_1$, $M_2$. FIG. 9 shows an example of such a look-up table 31 in the memory 30 of the controller 14 in form of two matrices 32, 33, one matrix 32 for a set of different regions 25 of increased per-pixel refresh rate $RR_{xy}$ which each cover a set of possible ROIs 26 and another matrix 33 for a set of different pairs of first and second modulation signals $M_1$, $M_2$. Each modulation signal $M_1$, $M_2$ is identified by the shape of the modulation signal within one period $1/f_{m1}$, $1/f_{m2}$ of the modulation signal, to be repeated over time t. Each pair of modulation signals $M_1$, $M_2$, i.e., each element of the matrix 33, corresponds to one region 25 of increased per-pixel refresh rate $RR_{xy}$ achievable with that pair of modulation signals $M_1$, $M_2$, i.e., to one respective element of the matrix 32.

For a specific ROI 26 detected, the controller 14 looks up the region 25 into which the ROI 26 falls (or which falls into that ROI 26) and retrieves from the correspondence between the elements of the matrices 32, 33 the corresponding first and second modulation signals $M_1$, $M_2$. The controller 14 then modulates the excitation signals $S_1$, $S_2$ with the modulation signals $M_1$, $M_2$ retrieved from the look-up table 31.

To perform the modulation, the display apparatus 1 may have discrete modulators 34, 35 receiving the excitation signals $S_1$, $S_2$ from the signal generators 23, 24 on the one hand and the modulation signals $M_1$, $M_2$ from the controller 14 on the other hand. Alternatively, the signal generators 23, 24 and modulator 34, 35 can be implemented by processing elements within the controller 14.

In general, different types of modulation signals $M_1$, $M_2$, can be used which lead to different shapes and sizes of regions 25 of increased per-pixel refresh rate $RR_{xy}$. Instead of the saw-tooth signals of FIG. 7, triangular signals with an offset could be used as modulation signals $M_1$, $M_2$, wherein the slopes of the triangles and the offset depend on the detected ROI 26, either to be hit or covered by the region 25 (former embodiment) or to be avoided by the region 25 (latter embodiment). FIGS. 10A-10E show further examples of useful modulations signals $M_1$, $M_2$ which lead to the different distributions of the per-pixel refresh rate $RR_{xy}$ over the image area 4 shown in FIGS. 11A-11E.

Figure 10A:
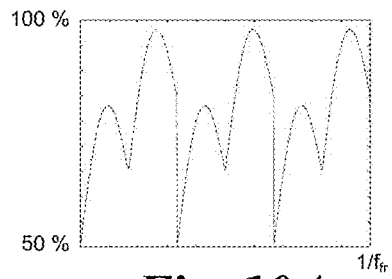
Figure 11A:
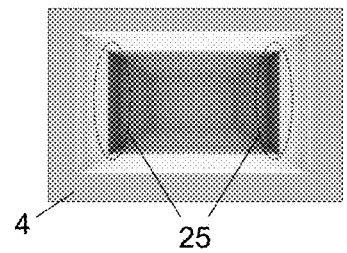
Figure 10B:
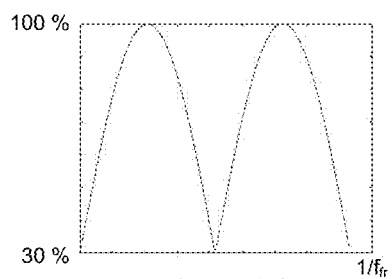
Figure 11B:
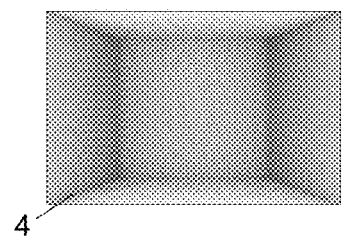

In FIG. 10A, the modulation signal $M_1$ or $M_2$ is a sequence of different sine halves per frame rate period $1/f_{fr}$, with an offset of 50%. In FIG. 10B, the modulation signal $M_1$ or $M_2$ is a sequence of two similar sine halfs with an offset of 30%.

Figure 10C:
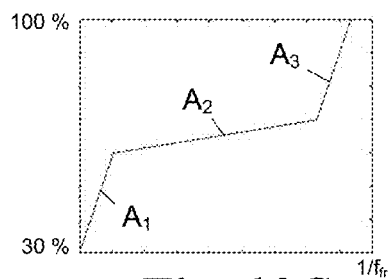
Figure 11C:
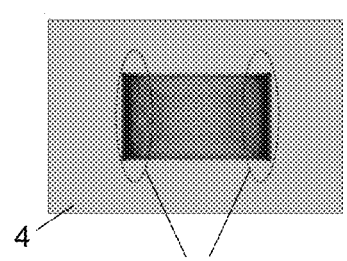
Figure 10D:
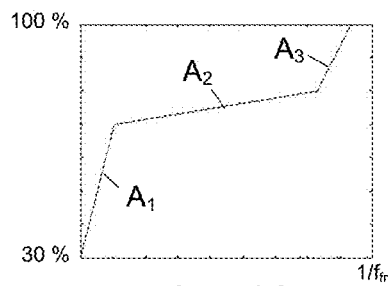
Figure 11D:
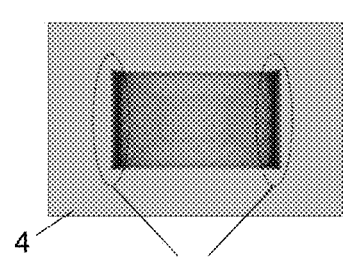
Figure 10E:
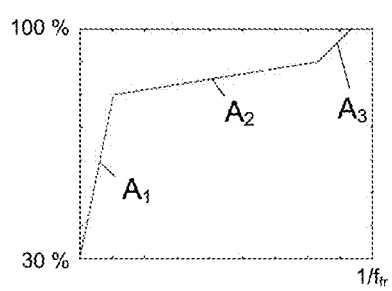
Figure 11E:
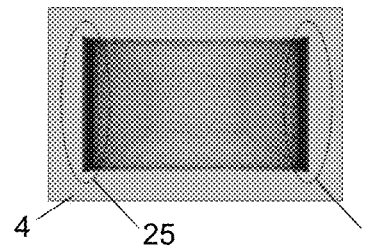

In FIGS. 10C-10E the modulation signal $M_1$ or $M_2$ is a step-like function comprised of a first section $A_1$ with high slope, a middle section $A_2$ with low slope, and a last section $A_3$ with high slope, and an offset of 30%. The respective slopes and lengths of the sections $A_1$, $A_2$, $A_3$ and the offset O each depend on the detected ROI 26 to cover (or: to avoid) with the region 25 of increased per-pixel refresh rate $RR_{xy}$ achieved with this sort of modulation.

In an optional variant (not shown), the modulation signal $M_1$ or $M_2$ is a repetition of a step function comprised of at least two sections of different respective constant values, wherein the respective values and lengths of the sections depend on the detected ROI 26. It goes with saying that each of the excitations signals $S_1$, $S_2$ can be modulated with the same or different modulation signals $M_1$, $M_2$, i.e., with modulation signals $M_1$, $M_2$ of different frequencies, shapes, amplitudes and offsets.

In the region 25 of increased per-pixel refresh rate $RR_{xy}$, there may occur a concomitant increase in light intensity perceived by the user. This is not only caused by the increased refresh rate itself but also by the varying local speed of the light beam 12 along its Lissajous trajectory L, as the light beam 12 moves slower in the periphery and faster in the middle of the image area 4. The perceived intensity in a pixel 3 thus depends on the total (i.e., summed) amount of time the light beam 12 spends in that pixel 3 during the time an image frame 2 is displayed. To counter this effect, the controller 14 can optionally decrease the intensity of the light beam 12 via the control input 13 of the light source 11 for a pixel 3 when the amount of time the light beam 12 spends in that pixel 3 during a frame 2 increases, and vice versa.

The disclosed subject matter is not restricted to the specific embodiments described herein, but encompasses all variants, modifications and combinations thereof that fall within the scope of the appended claims.

What is claimed is:

1. A display apparatus, comprising:
   a mirror assembly, wherein a first mirror of the mirror assembly is configured to oscillate about a first axis upon excitation by a first excitation signal of a first frequency and wherein the first or a second mirror of the mirror assembly is configured to oscillate about a second axis upon excitation by a second excitation signal of a second frequency;
   a light source configured to project a light beam onto the mirror assembly for deflection by the mirror assembly towards an image area, the light source having an input via which the light source can be controlled according to pixels of image frames to be displayed on the image area with a frame rate, each pixel of the image area being hit by the light beam with a per-pixel refresh rate;
   a gaze tracker configured to detect a user's region of interest, ROI, within the image area by tracking a user's gaze; and
   a controller connected to the gaze tracker and configured to modulate one of the first and second excitation signals by a first modulation signal which is dependent on the ROI detected by the gaze tracker.

2. The display apparatus according to claim 1, wherein the dependency of the first modulation signal on the ROI is such that the per-pixel refresh rate is higher in the ROI than outside of the ROI.

3. The display apparatus according to claim 1, wherein the frequency of the first modulation signal is a one- or morefold of the frame rate.

4. The display apparatus according to claim 1, wherein the controller is configured to decrease the intensity of the light beam for a pixel in the ROI when the amount of time the light beam spends in that pixel during a frame increases, and vice versa.

5. The display apparatus according to claim 1, wherein the controller is configured to amplitude-modulate said one of the first and second excitation signals by the first modulation signal.

6. The display apparatus according to claim 1, wherein the gaze tracker is configured to detect the ROI by predicting the ROI from an analysis of a past track of the user's gaze on the image area.

7. The display apparatus according to claim 6, wherein the gaze tracker is configured to determine a duration of a past saccade of the user's gaze from the analysis, and wherein the controller is configured to complete a change of the first modulation signal from one ROI to another ROI within that duration.

8. The display apparatus according to claim 1, wherein the display apparatus is configured to be head-mounted and the gaze tracker is an eye tracker.

9. The display apparatus according to claim 1, wherein the controller has a memory with a look-up table which stores, for each one of a set of different ROIs within the image area, a respective first modulation signal dependent on that ROI, wherein the controller is configured to retrieve the first modulation signal dependent on the detected ROI from the look-up table.

10. The display apparatus according to claim 9, wherein the controller is configured to modulate the other one of the first and second excitation signals by a second modulation signal which is dependent on the ROI detected by the gaze tracker, and wherein the look-up table stores, for each one of a set of different ROIs within the image area, a respective second modulation signal dependent on that ROI, wherein the controller is configured to retrieve also the second modulation signal dependent on the detected ROI from the look-up table.

11. The display apparatus according to claim 1, wherein the controller is configured to modulate the other one of the first and second excitation signals by a second modulation signal which is dependent on the ROI detected by the gaze tracker.

12. The display apparatus according to claim 11, wherein the dependency of the second modulation signal on the ROI is such that the per-pixel refresh rate is higher in the ROI than outside of the ROI.

13. The display apparatus according to claim 11, wherein at least one of the first and second modulation signals is a triangular or saw-tooth signal with an offset, wherein the slopes of the saw-teeth or triangles and the offset depend on the detected ROI.

14. The display apparatus according to claim 11, wherein at least one of the first and second modulation signals is a sequence of sine halves with an offset, wherein the amplitudes of the sine halves and the offset depend on the detected ROI.

15. The display apparatus according to claim 11, wherein at least one of the first and second modulation signals is a repetition of a step-like function comprised of a first and a last section with high slope, a middle section with low slope, and an offset, wherein the respective slopes and lengths of the sections and the offset depend on the detected ROI.

16. The display apparatus according to claim 11, wherein at least one of the first and second modulation signals is a repetition of a step function comprised of at least two sections of different respective constant values, wherein the respective values and lengths of the sections depend on the detected ROI.

* * * * *